United States Patent
Gummadivalli et al.

(10) Patent No.: US 12,147,561 B2
(45) Date of Patent: Nov. 19, 2024

(54) AUTOMATED DATABASE PROVISIONING AND METHODS THEREOF

(71) Applicant: Capital One Services, LLC, McLean, VA (US)

(72) Inventors: Nagesh Gummadivalli, Chantilly, VA (US); Aniket Sinkar, Glen Allen, VA (US); Arindam Chakraborty, Glen Allen, VA (US); Norflet Bailey, Woodford, VA (US); Clayton Mottley, Alexandria, VA (US); Arthur Maltson, Maple (CA); Elijah Sattler, Richmond, VA (US); Gregory Moczygemba, Quinton, VA (US); Nitin Sharma, Glen Allen, VA (US); Empress Marcelin, Glen Allen, VA (US); Bryan Barton, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 662 days.

(21) Appl. No.: 17/179,618

(22) Filed: Feb. 19, 2021

(65) Prior Publication Data

US 2022/0269811 A1 Aug. 25, 2022

(51) Int. Cl.
*G06F 9/54* (2006.01)
*G06F 21/45* (2013.01)
(Continued)

(52) U.S. Cl.
CPC ......... *G06F 21/6245* (2013.01); *G06F 9/54* (2013.01); *G06F 21/45* (2013.01); *G06F 21/604* (2013.01)

(58) Field of Classification Search
CPC ..... G06F 21/6245; G06F 21/45; G06F 21/604
See application file for complete search history.

(56) References Cited

U.S. PATENT DOCUMENTS 8,555,273 B1 * 10/2013 Chia ............... G06F 8/654
717/172
8,713,060 B2 4/2014 Sivasubramanian et al.
(Continued)

OTHER PUBLICATIONS

R. Warschofsky, M. Menzel and C. Meinel, "Automated Security Service Orchestration for the Identity Management in Web Service Based Systems," 2011 IEEE International Conference on Web Services, Washington, DC, USA, 2011, pp. 596-603, doi: 10.1109/ICWS.2011.41 (Year: 2011).*

(Continued)

*Primary Examiner* — Alexander Lagor
*Assistant Examiner* — Robert Matijasec
(74) *Attorney, Agent, or Firm* — Greenberg Traurig, LLP

(57) ABSTRACT

Systems and methods of the present disclosure enable the automated provisioning of security and compliance policies and onboarding to identity governance solutions. The systems and methods include processors to receive a database provisioning request associated with at least one entity and accessing at least one identity data record via an identity management mechanism associated with the at least one entity. The processors automatically access the database via a secured port; automatically cause to generate in the database, at least one privilege account and at least one access credential rule based on the at least one identity data record. The database is configured to utilize the at least one access credential rule to automatically manage access credentials for accessing the database via the at least one privilege account. The processors automatically disconnect from the secured port of the database.

20 Claims, 7 Drawing Sheets

(51) Int. Cl.
    *G06F 21/60*        (2013.01)
    *G06F 21/62*        (2013.01)

(56) References Cited

U.S. PATENT DOCUMENTS

| | | | | |
|---|---|---|---|---|
| 9,305,160 | B2* | 4/2016 | Adler | H04L 63/083 |
| 9,509,719 | B2* | 11/2016 | Neely | H04L 63/20 |
| 9,602,545 | B2* | 3/2017 | Pitre | H04L 63/102 |
| 10,171,508 | B2 | 1/2019 | Ylonen | |
| 10,708,379 | B1* | 7/2020 | Gupta | G06F 11/1471 |
| 11,032,213 | B1* | 6/2021 | Hussain | H04L 41/40 |
| 2014/0074905 | A1* | 3/2014 | Schincariol | H04L 67/10 |
| | | | | 709/201 |
| 2015/0026215 | A1* | 1/2015 | Goel | G06F 21/604 |
| | | | | 707/784 |
| 2018/0316730 | A1* | 11/2018 | Schaefer | H04L 41/28 |
| 2020/0320130 | A1* | 10/2020 | Korpman | G06F 40/295 |

OTHER PUBLICATIONS

Knox, Applied Oracle Security: Developing Secure Database and Middleware Environments (Year: 2009) (Year: 2009).*
Dubois, MySQL cookbook 3rd Edition (Year: 2014).*
Jackson, The Complete ASP.NET Core 3 API Tutorial (Year: 2020).*

* cited by examiner

AUTOMATED DATABASE PROVISIONING AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to systems and methods for automated database provisioning, including the automated provisioning of security and compliance policies and onboarding to identity governance solutions.

BACKGROUND OF TECHNOLOGY

Cloud systems enable easy installation of databases, such as relational databases. As a result, many databases in private, public and on-premises cloud systems are created and modified, with large numbers of users. As a result, management of permissions for user access as well as programmatic access to data stored in the database is an important capability for these databases. However, the data in the databases often have various different types of information, each of which have its own governmental, industry, enterprise and organization security compliance standards. Moreover, the users and programs may be of various different types and permission levels for access to the data based on the security compliance standards.

Managing permissions across all users and programs with respect to each type of data can often require time and resource consuming processes to update identity data records and identity permissions for each of the users and programs. Often, these management processes are also performed by administrators that access the identity governance platforms manually, creating a vector for insecure and unwanted modifications to the permissions.

SUMMARY OF DESCRIBED SUBJECT MATTER

In some embodiments, the present disclosure provides an exemplary technically improved computer-based method that includes at least the following steps of receiving, by at least one processor, a database provisioning request associated with at least one entity, where the database provisioning request specifies a database; accessing, by the at least one processor, at least one identity data record via an identity management mechanism associated with the at least one entity, where the at least one identity data record specifies: i) at least one credential identity associated with the at least one entity, and ii) at least one credential management policy associated with the at least one credential identity; automatically accessing, by the at least one processor, the database via a secured port; automatically causing, by the at least one processor, to generate in the database, at least one privilege account based on the at least one credential identity; automatically causing, by the at least one processor, to define within the database, at least one access credential rule based on the at least one credential management policy, where the database is configured to utilize the at least one access credential rule to automatically manage access credentials for accessing the database via the at least one privilege account; and automatically disconnecting, by the at least one processor, from the secured port of the database.

In some embodiments, the present disclosure provides an exemplary technically improved computer-based system that includes at least the following components of at least one processor in communication with a non-transitory computer readable medium having software instructions stored thereon. The at least one processor is configured, upon execution of the software instructions, to perform steps to: receive a database provisioning request associated with at least one entity, where the database provisioning request specifies a database; access at least one identity data record via an identity management mechanism associated with the at least one entity, where the at least one identity data record specifies: i) at least one credential identity associated with the at least one entity, and ii) at least one credential management policy associated with the at least one credential identity; automatically access the database via a secured port; automatically cause to generate in the database, at least one privilege account based on the at least one credential identity; automatically cause to define within the database, at least one access credential rule based on the at least one credential management policy, where the database is configured to utilize the at least one access credential rule to automatically manage access credentials for accessing the database via the at least one privilege account; and automatically disconnecting, by the at least one processor, from the secured port of the database.

Embodiments of the systems and methods of the present disclosure further include where the at least one credential identity includes programmatic access credential identities including: i) master database identity, ii) shared database identity, iii) application access identity, and iv) reconciliation account identity.

Embodiments of the systems and methods of the present disclosure further include where the at least one credential identity includes user access credential identities including: i) an automation server identity, and ii) at least one user account identity.

Embodiments of the systems and methods of the present disclosure further include where the access credentials include at least one privilege account password.

Embodiments of the systems and methods of the present disclosure further include where the at least one access credential rule includes password reset periods for the at least one privilege account password.

Embodiments of the systems and methods of the present disclosure further include automatically generating, by the at least one processor, new passwords for accessing the at least one privilege account based on the password reset periods.

Embodiments of the systems and methods of the present disclosure further include determining, by the at least one processor based on the at least one credential management policy, the at least one access credential rule from a set of access credential rules.

Embodiments of the systems and methods of the present disclosure further include deploying, by the at least one processor upon disconnecting from the secured port, the database using a continuous integration continuous deployment pipeline.

Embodiments of the systems and methods of the present disclosure further include automatically instantiating, by the at least one processor, an automated database provisioning tool to produce API requests associated with an automated database provisioning API set to: automatically identify one or more security services, automatically provide the identity data record and at least one compliance policy to the one or more security services, and automatically cause the one or more security services to configure account access to the database for the identity data record according to at least one compliance policy.

Embodiments of the systems and methods of the present disclosure further include onboarding, by the at least one processor, an identity governance platform to implement the at least one access credential rule.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
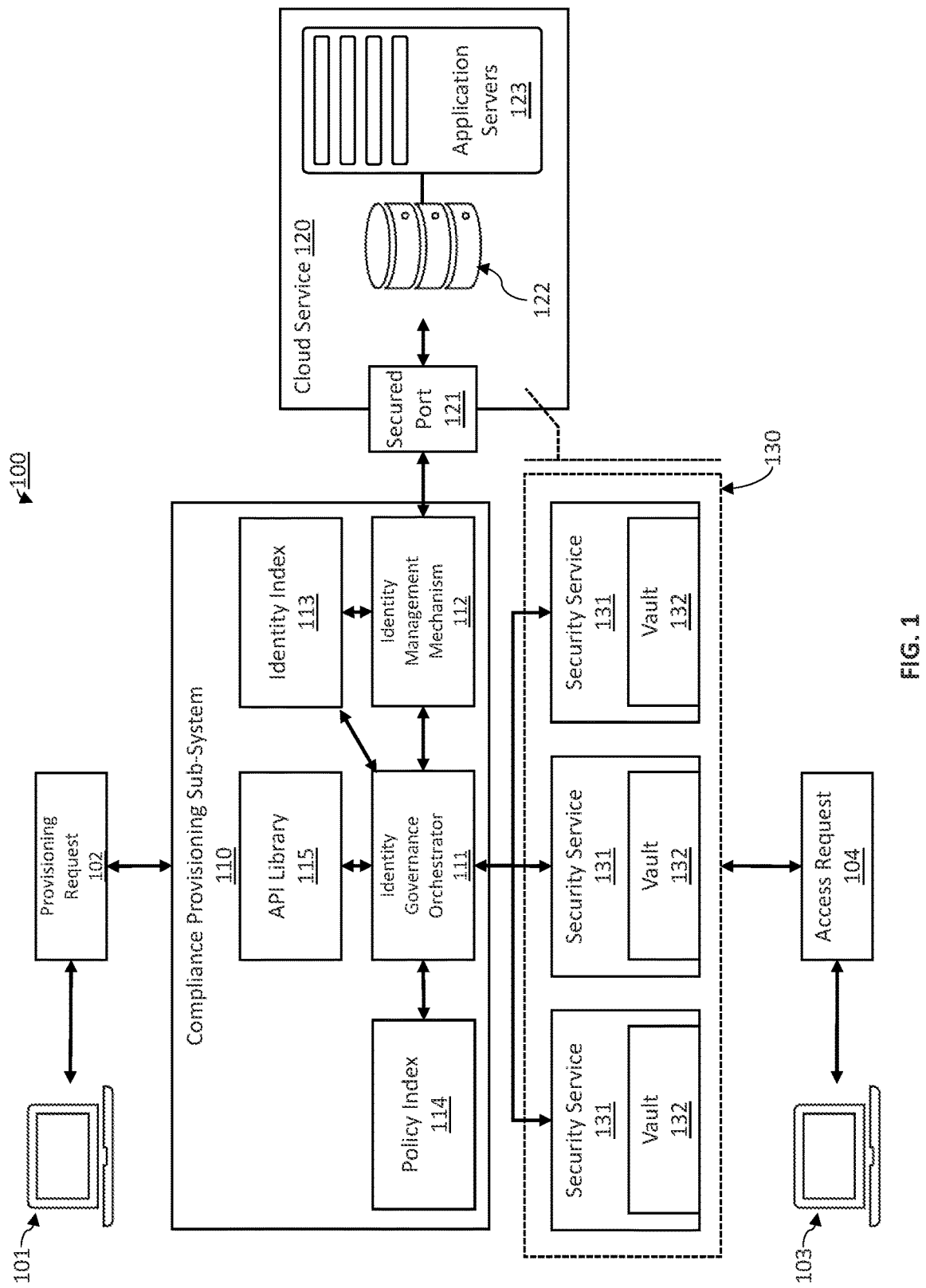
FIGS. 1-7 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of identity and security compliance provisioning for on-premises/private ("on-prem") and public cloud systems. The following embodiments provide technical solutions and technical improvements that overcome technical problems, drawbacks and/or deficiencies in the technical fields involving identity and compliance provisioning and management in databases using one or more identity governance platforms. As explained in more detail, below, technical solutions and technical improvements herein include aspects of improved provisioning of relational databases in on-prem and public cloud providers with enterprise security standards. Embodiments of these technical solutions solves the problem of integrating a database, e.g., a relational database with multiple data security governance applications to form an identity lifecycle and credential management solution that mitigates risks related to unmanaged and insecure privileged access by integrating with and orchestrating enterprise governance and auditing tools for security policy compliance.

Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of an embodiment of an automatic database provisioning system in accordance with one or more embodiments of the present disclosure.

In some embodiments, an automatic database provisioning system 100 may include a compliance provisioning sub-system 110 in communication with a cloud service 120. In some embodiments, the compliance provisioning sub-system 110 provides automated integration between a database 122 of the cloud service 120 and security services 131 to enable automated and secure identity lifecycle management, identity governance, access management, and compliance management and auditing.

In some embodiments, the compliance provisioning sub-system 110 may effectuate the integration of the cloud service 120 and the security services 131 upon receiving a provisioning request 102 from an administrative computing device 101. In some embodiments, the administration computing device 101 may include one or more computing devices. As used herein, a computing device may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, terminal device, thin client, and so forth.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

As used herein, the terms "virtual machine (VM)" identifies at least one software component and/or a combination of at least one software component and at least one hardware component which are designed/programmed/configured to virtually emulate physical computer systems, such as, e.g., system virtual machines that provide a virtualization of a physical machine, a process virtual machine that is designed to execute computer programs in a virtual environment, or other duplication of real computing systems in a virtual environment.

In some embodiments, database provisioning includes processes of preparing and equipping a database (e.g., the database 122) to allow it to provide data and services to users. In some embodiments, part of this database provisioning includes establishing identities or accounts in the database 122 with account types and access permission according to one or more data security policies. In some embodiments, this provisioning may include configuring the database 122 with the identities (e.g., user accounts, software program or application accounts, account types, etc.) for which access permissions are to be applied as well as credentials for access, among other identity data.

For example, identity types can include, e.g., a master account with master privileges for full read-write access to the database 122, a shared account with read-only or read-write privileges in shared directories of the database 122, an application access account with application-specific read-only or read-write privileges to application-specific directories of the database 122, a reconciliation account for data reconciliation privileges, among other account types and associated privileges and permissions.

Rather than manually configuring the database 122 with the identity data, the compliance provisioning sub-system 110 may automatically and securely identify the identities to provision and effectuate the provisioning of the identities to the database 122 without the administrator manually configuring each account or account type. As such, the compliance provisioning sub-system 110 removes the manual steps, and thus removes the possibility for user error, poor judgement, security breaches, among other security and confidentiality compromises.

Thus, to provide the database 122 with the identities and credentials, among other identity data, rather than configuring the accounts, credentials and other identity data for the database 122, an administrator at the administrative computing device 101 may input, e.g., a selection of database to be provisioned, a group, unit, division, enterprise, user, or other entity or set of entities for which the database is to be provisioned, data types for which the database 122 is to be used to store, among other data and information related to database provisioning (e.g., applications or services for which the database is to be provisioned, etc.) and combinations thereof.

In some embodiments, the provision request 102 may be communicated to the compliance provisioning sub-system 110 via, e.g., a suitable application programming interface (API), messaging protocol, or other communication technology. In some embodiments, the provisioning request 102 may be communicate across, e.g., a direct interface between the administrative computing device 101 and the compliance provisioning sub-system 110 or across a network (such as a local area network (LAN), wide area network (WAN), Internet, intranet, or other network and combinations thereof), or a combination thereof. In some embodiments, the connection may include, e.g., hard wired connections (e.g., fiber optic cabling, coaxial cabling, copper wire cabling, ethernet, etc.), wireless connections (e.g., WiFi, Bluetooth, Zigbee, Z-Wave, cellular networking such as 5G, 4G, Long Term Evolution (LTE), 3G, High-Speed Downlink Packet Access (HSPA), Global System for Mobile Communications (GSM), Code-division multiple access (CDMA) or other technologies, and combinations thereof), or combination thereof.

In some embodiments, the administrative computing device 101 may utilize the selections to generate the provisioning request 102 to specify the database 122 to the compliance provisioning sub-system 110, among other selections (e.g., the entity or set of entities, the applications or services, etc.). In some embodiments, the compliance provisioning sub-system 110 may utilize the specified database 122 and other selections to determine the appropriate accounts and policies with which to configure the database 122.

In some embodiments, the compliance provisioning sub-system 110 may include one or more computer engines to implement database provisioning as well as orchestration of identity governance by one or more security services 131 to implement security policy compliance. As used herein, the terms "computer engine" and "engine" identify at least one software component, at least one hardware component or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to enable the compliance provisioning sub-system 110 to provision the database 122 with identities, an identity management mechanism 112 may access an identity index 113. In some embodiments, the identity index 113 may include, e.g., identity data records associated with each user, software program, software application, software service, or other identity and combinations thereof. In some embodiments, an identity data record may include, e.g., an identifier, a type (e.g., entity type, account type, program/application/service type, etc.), hierarchical personnel data, a role (e.g., user position or role within a team or enterprise), clearance level, a team associated with the identity, among other organizational, service, data, and programmatic information associated with each identity. For example, the identity index 113 may reflect, e.g., human resources (HR) records including personnel information, project information (e.g., from a project management service or database such as Asana™, Jira™, Microsoft Dynamics, etc.), among other identity information sources. As a result, the identity management mechanism 112 may automatically determine relevant identities in response to a provisioning request 102 having little more than project, task, group, or purpose for the database to be provisioned.

In some embodiments, in response to the provisioning request 102, the identity management mechanism 112 may utilize the specification of the data to identify the database 122 in the cloud service 120, e.g., via a table, library, index, or other structure cataloging databases and database addresses. In some embodiments, the identity management mechanism 112 may reference the structure cataloging the databases to determine whether a database matching the specified database exists. For example, where the provisioning request 102 includes a specification of a database including an identifier, e.g., a network address, an identification number, a unique name, or other identifier, the identity management mechanism 112 may reference the identifier in the structure cataloging the databases to determine whether a matching database is instantiated in the cloud service 120.

Where the identifier matches the database 122, the identity management mechanism 112 may connect to the database 122 via a secured port 121. However, where the database does not yet exist in the cloud service 120, the identity management mechanism 112 may initialize the database 122 according to the provisioning request 102 and add the identifier of the database 122 and network address to the structure cataloging the databases. In some embodiments, initializing the database 122 includes determining and establishing a network address for the database 122 and attaching the secured port 121 to communicate with the database 122.

In some embodiments, the secured port 121 includes a communication port configured for restricted access by the identity management mechanism 112. In some embodiments, a port refers to a communication endpoint. In some embodiments, the port can take the form of a logical construct at a software level that identifies a specific process or a type of network service. In some embodiments, a port is identified for each transport protocol and address combination by a port number, such as, e.g., 16-bit unsigned number. Examples of ports may include, e.g., File Transfer Protocol (FTP) data transfer port, FTP command control port, Secure Shell (SSH) secure login port, Telnet remote login service port, Simple Mail Transfer Protocol (SMTP) E-mail routing port, Domain Name System (DNS) service port, Dynamic Host Configuration Protocol (DHCP) port, Hypertext Transfer Protocol (HTTP) used in the World Wide Web port, Post Office Protocol (POP3) port, Network News Transfer Protocol (NNTP) port, Network Time Protocol (NTP) port, Internet Message Access Protocol (IMAP) port, Simple Network Management Protocol (SNMP) port, Internet Relay Chat (IRC) port, HTTP Secure (HTTPS) HTTP over TLS/SSL port, among others.

In some embodiments, the secured port 121 can include, e.g., an HTTPS port, SSH port or other suitable communication port, such as a port equipped with suitable encryption. To secure the secured port 121 such that access to the database 122 is restricted to the identity management mechanism 112. For example, in some embodiments, the secured port 121 may include a security group, such as an enterprise security group, for control of incoming and outgoing traffic via compute and data of the database 122 and cloud service 120. The security group for the secured port 121 may be dynamically attached and detached from the database 122 during provisioning for ephemeral, and thus secured access for database 122 provisioning.

In some embodiments, the database 122 may include any organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity—relationship database, an enhanced entity—relationship database, a document database, an entity—attribute—value database, a star schema database, or any other suitable database model and combinations thereof. For example, the database 122 may include database technology such as, e.g., a centralized or distributed database, cloud storage platform, decentralized system, server or server system, among other storage systems. In some embodiments, the database 122 may, additionally or alternatively, include one or more data storage devices such as, e.g., a hard drive, solid-state drive, flash drive, or other suitable storage device. In some embodiments, the database 122 may, additionally or alternatively, include one or more temporary storage devices such as, e.g., a random-access memory, cache, buffer, or other suitable memory device, or any other data storage solution and combinations thereof.

Depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

The database may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

In some embodiments, the provision the identities to the database 122 via the secured port 121, the identity management mechanism 112 may access the identity index 113 to reference identity data records stored therein. In some embodiments, each identity data record may include data related to the user or software of the identity represented therein. For example, an identity data record may include, e.g., a credential identity (e.g., an identifier such as a user name, application or program name, software build number, employee number, etc.), an identity type (e.g., software program, cloud service, user, administrator, etc.), a grouping (e.g., software program or software application or cloud service type, project team to which the user belongs, an enterprise or company to which the user belongs, etc.), a role (e.g., user position or role within a team or enterprise), clearance level, a region associated with the identity, among other data.

As a result, a provisioning request 102 that includes only, e.g., a user type, a user role, a user clearance level, a software program type, a project team, or similar data and combinations thereof may be used to automatically identify the associated identities in the identity index 113. In some embodiments, the identity management mechanism 112 may also identify itself as an identity for provisioning to the database 122, thus enabling the identity management mechanism 112 for future access to the database 122 with associated permissions.

In some embodiments, the identity management mechanism 112 may access the identity index 113 and utilize the provisioning request 102 to automatically identify and extract the associated identities to provision to the database 122. In some embodiments, provisioning the database 122 with the identities may include, e.g., creating within the database 122 a privileged account for each identity. A privileged account includes the identity and associated data as well as account credentials.

In some embodiments, the identity management mechanism 112 may automatically initialize for each privileged account a set of credentials. In some embodiments, the credentials may be a password, personal identification number (PIN), contact information (phone number, email address, etc.), access location, or other information for authenticating the user or program associated with the identity and the privileged account. For example, in some embodiments, the identity management mechanism 112 may automatically generate a random password for each privileged account.

In some embodiments, the cloud service 120 may include one or more application servers 123 in communication with the database 122. The application servers 123 may include, e.g., any service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and a connection to the database 122 and application software that support the services provided by the server.

In some embodiments, upon the identity management mechanism 112 completing the provisioning of the identities by establishing the privileged accounts and credentials, the identity management mechanism 112 may pass the identities, privileged accounts and credentials to an identity governance orchestrator 111. In some embodiments, the identity governance orchestrator 111 may utilize the identities, privileged accounts and credentials to onboard the identities into one or more security services 131.

In some embodiments, access to the database 122 and information stored therein needs to be granted according to the standard corporate policies, governmental policies, and industry best practices. Accordingly, in some embodiments, the identity governance orchestrator 111 automatically onboards the database 122 into an identity governance platform 130 having one or more security services 131 to govern identity lifecycle management and access management.

In some embodiments, the identity governance orchestrator 111 performs the onboarding by determining applicable compliance monitoring and auditing services, access management services, identity management services, among other security services 131. In some embodiments, the identity governance orchestrator 111 may automatically onboard to each of the available security services 131. Alternatively, the identity governance orchestrator 111 may automatically identify a set of security services 131 applicable to the database 122. For example, the identity governance orchestrator 111 may receive the identities from the identity management mechanism 112, from the identity index 113 based on the provisioning request 102 or both.

In some embodiments, some types of identities may utilize particular access management services or identity management services. For example, programmatic access and user access may be managed by different identity lifecycle management and access management services. Accordingly, where the identities include software programs, the identity governance orchestrator 111 may determine that the security service 131 for programmatic identity lifecycle management and programmatic access management may be applicable. Similarly, where the identities include users, the identity governance orchestrator 111 may determine that the security service 131 for user identity lifecycle management and user access management may be applicable. Thus, the identity governance orchestrator 111 may automatically identify the security services 131 on which to onboard the database 122 based on the identities provisioned to the database 122.

In some embodiments, one or more compliance and auditing services may be employed based on the data compliance policies associated with the data in the database 122. In some embodiments, based on the specification of the database in the provisioning request 102 (such as a software program types), the application servers 123 associated with the database 122 in the cloud service 120, or other information, the identity governance orchestrator 111 may automatically determine the applicable compliance and auditing services.

For example, where the software programs or application servers 123 include electronic medical record (EMR) programs and services, the identity governance orchestrator 111 may identify security services 131 for compliance and auditing according to the Health Insurance Portability and Accountability Act (HIPAA). Similarly, where the software programs or application servers 123 include financial transaction-related programs and services, the identity governance orchestrator 111 may identify security services 131 for compliance and auditing according to the Payment Card Industry Data Security Standard (PCI DSS) and/or Sarbanes-Oxley Act of 2002 (SOX). In some embodiments, the identity governance orchestrator 111 may be configured to always onboard the database 122 into security services 131 for compliance and auditing according to the California Consumer Privacy Act (CCPA), the General Data Protection Regulation (GDPR), the Federal Information Security Management Act (FISMA), or a subset thereof.

In some embodiments, to identify the appropriate policies for the database 122, the identity governance orchestrator 111 may reference a policy library 114 with the specification of the database in the provisioning request 102 (such as a software program types), the application servers 123 associated with the database 122 in the cloud service 120, or other information. In some embodiments, the policy library 114 may specify data compliance policies and auditing rules associated with, e.g., each software program type, each cloud service performed by the application servers 123, and other information related to access to the data in the database 122. Thus, by employing such information, the identity governance orchestrator 111 may identify the applicable compliance and auditing policies for the database 122.

In some embodiments, to enable onboarding to the various security services 131 forming the identity governance platform 130, the identity governance orchestrator 111 may utilize a set of application programming interfaces (APIs) for interfacing with the security services 131. In some embodiments, the identity governance orchestrator 111 may employ an API library 115 to identify the API associated with each applicable compliance and auditing policy and with each of the identity lifecycle management and access management services.

Herein, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, the API library 115 may be hard coded into the identity governance orchestrator 111 or may be a separate data structure in communication with the identity governance orchestrator 111. In either case, the identity governance orchestrator 111 may utilize the applicable compliance and auditing policies to identify the associated applicable compliance and auditing services of the security services 131.

In some embodiments, the identity governance orchestrator 111 utilizes the API of each security service 131 to orchestrate onboarding into the identity governance platform 130. For example, the identity governance orchestrator 111 may utilize an access manager API associated with a particular access management services for managing privileged user access to the database 122. Accordingly, the identity governance orchestrator 111 may, through a suitable API call, provide the user privileged accounts and associated credentials to the associated security service 131. In some embodiments, the security service 131 for the particular access management services for managing privileged user access to the database 122. Based on the API call, the security service 131 may vault the user accounts and associated credentials in a vault 132. In some embodiments, the vault 132 may include an encrypted storage location or other suitable secrets vaulting mechanism.

Similarly, the identity governance orchestrator 111 may utilize an access manager API associated with a particular access management services for managing privileged programmatic access to the database 122. Accordingly, the identity governance orchestrator 111 may, through a suitable API call, provide the programmatic (e.g., software programs and software applications) privileged accounts and associated credentials to the associated security service 131. In some embodiments, the security service 131 for the particular access management services for managing privileged programmatic access to the database 122. Based on the API call, the security service 131 may vault the programmatic accounts and associated credentials in a vault 132.

In some embodiments, the security service 131 is a privileged access management service (PAMS). A PAMS is a system which manages privileged accounts, access and actions in accordance with organizational policy, mainly by controlling and managing the credentials to privileged accounts (i.e. privileged credentials). The PAMS may include user authentication, mapping of which users are allowed usage of which privileged account and logging of privileged accounts usage. The PAMS may include additional features such as monitoring of actions performed by privileged users. Yet additional features may include support of various workflows, for example managerial approval for password retrieval, correlation with ticketing systems, one-time passwords, password replacement, and password rotation and rotation policies. Thus, the PAMS is able to support and enforce organizational policies and procedures for network security and access control to the cloud service 120, and in particular to the database 122. The PAMS may be, for example, a system commercially available as PIM (Privileged Identity Management)/PSM (Privileged Session Management) Suite or other system, e.g., Azure AD, Qualys, Cyber-Ark, SailPoint Technologies Holdings, Oracle, IBM, One Identity, CA Technologies.

In some embodiments, the cloud service 120 may include master credentials for a master account, superuser account or root account (hereinafter collectively referred to as the "master account"). To further secure the access to the cloud service 120, the security service 131 may abstract the credentials for the master or root account of the cloud service 120 for storage and management in the PAMS, e.g., in the vault 132. For example, as described above, random passwords may be generated for the master credentials, which may be added to a master account managed by the PAMS. Thus, credential rotation and other credential management functions can be implemented for controlled access via the master or root account similar to other credentials. In some embodiments, this may include an agnostic master account control module for the PAMS, either as a part of the PAMS or external to the PAMS. Accordingly, access via a master account may be managed automatically by the PAMS rather than by a human administrator, thus improving security by reducing vectors for compromising the master credentials.

Accordingly, the identity governance orchestrator 111 may orchestrate multiple different security services 131 including PAMS and other access management, data policy compliance enforcement and monitoring, network security, among other security services 131. In some embodiments, the role of each security service 131 in data and network security may be defined according to enterprise, industry and regulatory policies. For example, security services 131 may be employed for, e.g., user privileged account and credential management, programmatic privileged account and credential management, data compliance auditing, network security enforcement (e.g., a firewall, traffic monitory, etc.), among other security services 131. Upon provisioning the database 122 with the identities, the identity governance orchestrator 111 may utilize the API library 115 according to the policies of the policy library 114.

In some embodiments, based on the policies from the policy library 114 associated with the provisioning request 102 and the database 122, the identity governance orchestrator 111 may identify the associated security services 131 and the applicable credential management policy. Thus, when issuing the API calls to each security service 131, the identity governance orchestrator 111 may specify the access policies for the identities and access being managed by each of the security services 131, including the master account and master credentials. Accordingly, the identity governance orchestrator 111 may orchestrate each security service 131 to conform to, e.g., password rotation policies, password complexity requirements, password lifecycle and life span policies, privilege level policies based on each identity, among other security policy related specifications. Using the APIs from the API library 115, the identity governance orchestrator 111 may configure each security service 131 for providing user privileged account and credential management, programmatic privileged account and credential management, data compliance auditing, network security enforcement (e.g., a firewall, traffic monitory, etc.), etc. according to policies.

As a result, a holistic identity governance platform 130 is constructed and orchestrated by the identity governance orchestrator 111 according to policies as recorded in the policy library 114. Therefore, a provisioning request 102 can be used to onboard the database 122 into the identity governance platform 130 according to the appropriate policies without the administrator explicitly specifying which policies to use to configure each security service 131. Rather, the policies are automatically identified and applied in a consistent manner, removing the risk of user error or malicious acts in onboarding the database 122 into the identity governance platform 130.

Therefore, embodiments of the present disclosure solve for vaulting privilege accounts (human and programmatic) in secure vaults 132 and onboarding the database 122 into an enterprise identity governance platform 130 using a plug and play approach. The plug and play approach integrates with enterprise governance and auditing tools for compliance needs using an API driven approach with capabilities to integrate monitoring solutions and provision accounts with corresponding permissions for programmatic access. The solution also provides a way to rotate passwords for privileged accounts and programmatic access to convert long lived credentials to short lived credentials to enhance the credential security.

In some embodiments, the database 122 privileged accounts and policies can be updated at any time with another provisioning request 102 specifying the database 122. For example, a new provisioning request 102 changing, e.g., the project, the team, the roles, or other changes can automatically trigger the identity management mechanism 112 to update the privileged accounts in the database 122 via the secured port 121, and the identity governance orchestrator 111 to orchestrate the security services 131 to onboard the updated database 122 and implement the appropriate policies. Similarly, changes to the identity index 113 (e.g., via changes to personnel records or project management records, etc.) may automatically cause the identity management mechanism 112 and identity governance orchestrator 111 to update the privileged accounts and applicable policies. As a result, an administrator may change a personnel record, for example, and each database 122 provisioned with the identity associated with that personnel record may be updated with the new information, such as new permission level, new password policies, etc. By employing the secured port 121, the identity management mechanism 112 may be given exclusive permission to access the database 122 for identity provisioning, thus providing both secured and automated database provisioning in response to provisioning requests 102 and identity changes.

Similarly, the identity governance orchestrator 111 may automatically respond to changes to, e.g., a personnel record, security policy, project management record, or other information to orchestrate the security services 131 using the API library 115 to update access management, monitoring, auditing, and lifecycle services according to the changes.

Accordingly, the compliance provisioning sub-system 110 provides an idempotent way to integrate privileged access control, identity governance, compliance monitoring, and database provisioning, among other identity lifecycle and management functions with continuous integration and continuous delivery (CICD) pipelines.

In some embodiments, upon completion of the onboarding of the database 122 into the identity governance platform 130, the compliance provisioning sub-system 110 may detach from the database 122, e.g., by disconnecting from the secured port 121. A user at a user computing device 103 may then access the cloud service 120, including the database 122, by authenticating with one or more of the security services 131.

In some embodiments, the user computing device 103 may include one or more computing devices, mobile devices, or combinations thereof. As used herein, the term "mobile device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the user computing device 103 may communicate an access request 104 to the cloud service 120 to request access to the database 122. The access request 104 may be received by the cloud service 120 and automatically trigger the identity governance platform 130 to manage access according to the access request 104. For example, the access request 104 may specify the user's identity (e.g., an account identify identifying the privileged account), and associated credentials, such as a password. In some embodiments, the access request 104 is for the user's direct access to the database 122, but in some embodiments, the access request 104 may be for a software program to access the database 122 in response to a user selection that triggers the software program, such as, e.g., an application or service running on the application servers 123 or by a local application at the user computing device 103.

In some embodiments, the identity governance platform 130 may receive the access request 104 and, based on the account identifier, may call the security service 131 managing access via the associated privilege account. The security service 131 may then extract the credentials for the account identifier from the vault 132 and compare the credentials to the credentials providing with the access request 104. Where the account identifier and the credentials match, the security service 131 may enable access to the database 122 via the associated privilege account according to permissions set by the policies specified during onboarding.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

Figure 2:
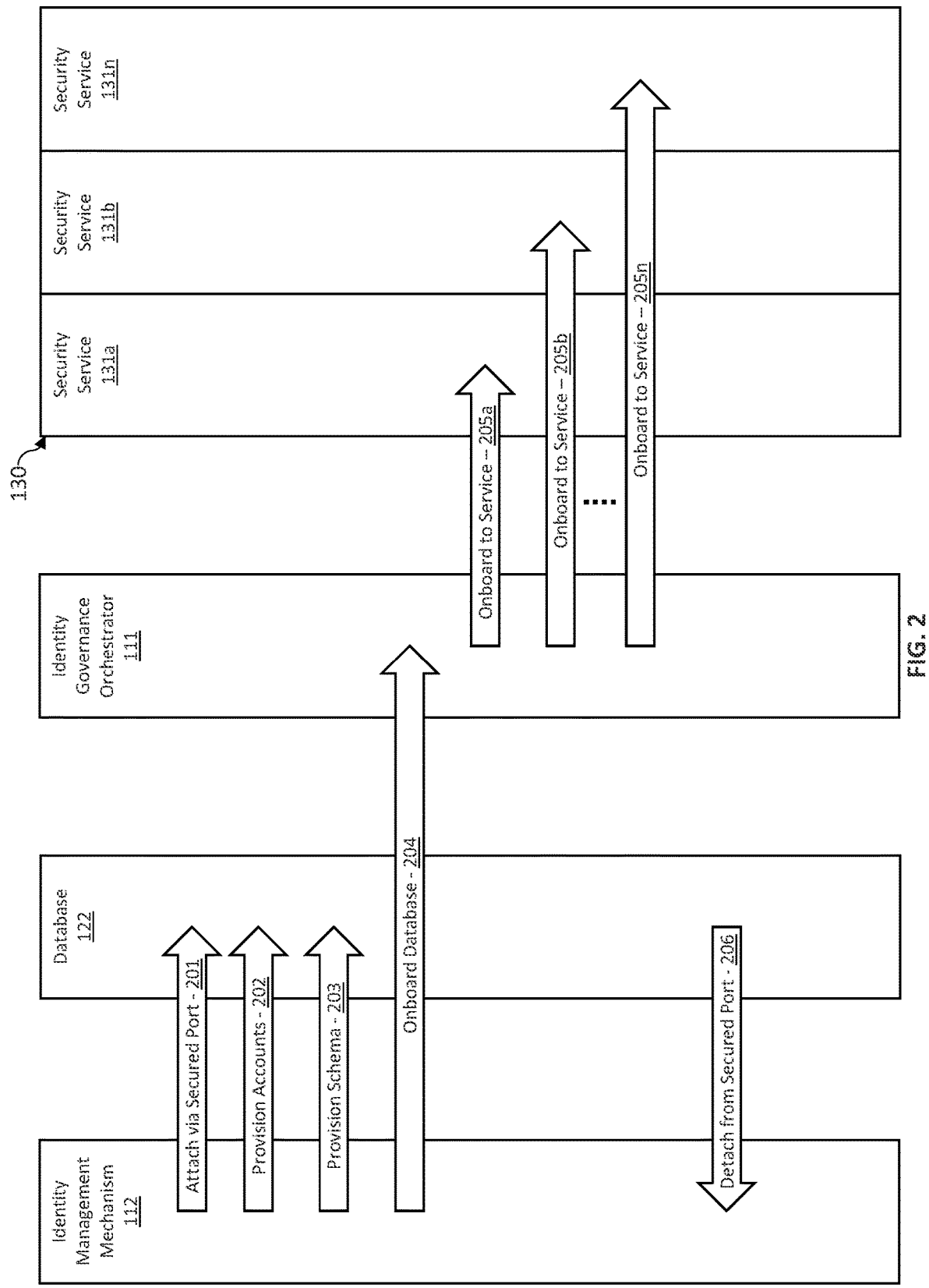

FIG. 2 is a block diagram of another embodiment of an automatic database provisioning system including configurations for database provisioning and access manager onboarding in accordance with one or more embodiments of the present disclosure.

In some embodiments, the compliance provisioning sub-system 110 may automatically provision and onboard a database 122. To do so, the compliance provisioning sub-system 110 may execute a series of processes amongst the database 122 and one or more security service 131a through security service 131n. In some embodiments, this series of processes is facilitated by attaching the identity management mechanism 112 to the database 122 via a secured port at the process of block 201. In some embodiments, the secured port (e.g., secured port 121 described above) provides a secure communication connection between the identity management mechanism 112 and the database 122. In some embodiments, the secured port may serve as the exclusive means by which privileged accounts may be provisioned to the database 122. For example, upon initializing a new database 122, the secured port may be added as a part of the configuration process with exclusive permissions to write to the privileged accounts. However, in some embodiments, additional secured ports may be configured for the database 122 for other permissioned entities and mechanism to write to the privileged accounts for, e.g., account management and permissioning, account administration, among other purposes.

In some embodiments, upon attaching to the database 122, the identity management mechanism 112 may write to the privileged accounts of the database 122 and provision privileged accounts at the process of block 202. In some embodiments, provision privileged accounts may include writing account identifiers to the database 122 and generating credentials for privileged access by the accounts associated with the account identifiers. In some embodiments, the privileged accounts may each include a set of permissions for which each privileged account is provided for database 122 access, such as, e.g., to what data each account has privileged access to, whether access is read only or read-write, among other permissions.

In some embodiments, the identity management mechanism 112 may also provision a schema to the database 122 at the process of block 203. In some embodiments, the schema may be provisioned using a suitable database migration tool, such as, e.g., a Flyway database migration tool, Liquibase, among other suitable applications and services for database migration. In some embodiments, the compliance provisioning sub-system 110 may be pluggable for any database migration tool or other database provisioning toolsets for plug-and-play integration via API access. Thus, any database provisioning related toolsets can be implemented as long as the toolsets are available via API.

In some embodiments, the database migration tool provides to the database 122 a database schema including, e.g., a structure described in a formal language supported by the database management system (DBMS) of the database 122. The term "schema" refers to the organization of data as a blueprint of how the database is constructed (for example, divided into database tables in the case of relational databases), including, e.g., a set of formulas (sentences) called integrity constraints. These integrity constraints facilitate compatibility between parts of the schema and are all expressible in the same language. Accordingly, the database 122 may a structure formed in realization of the database language where the schema provides an explicit mapping that describes how real-world entities are modeled in the database. In some embodiments, the schema may include permissioning constraints that define access by the privileged accounts according to the associated permissions of each privileged account.

In some embodiments, upon provisioning the database 122 with the accounts and schema, the identity management mechanism 112 may instruct the identity governance orchestrator 111 to onboard the database 122, via the process of block 204, into one or more security service 131a, security service 131b through security service 131n via associated processes to onboard to the security service 131a through security service 131n according to the privilege accounts, credentials and schema, including associated permissions. In some embodiments, onboarding the database 122 into services via the process at block 205a, the process at block 205b through the process at block 205n may be performed sequentially or in parallel.

In some embodiments, the identity governance orchestrator 111 may identify the security service 131a through security service 131n associated with the privileged accounts and the schema, such as, e.g., access management services depending on the identities of the privileged accounts, data compliance monitoring and auditing based on the schema, among other security services. The identity governance orchestrator 111 may configure each security service 131a through security service 131n using suitable API calls for each security service 131a through security service 131n to orchestrate an identity governance platform to govern identities and compliance in the database 122. Accordingly, the identity governance orchestrator 111 may orchestrate application of each security service 131a through security service 131n to the database 122 to provide, e.g., access management, credential lifecycle and rotation management (such as, e.g., rotating passwords, updating password length requirements, among other credential policy requirements), data compliance monitoring according to applicable enterprise, industry and regulatory compliance policies, data auditing for ensuring compliance, among other security services for automatic configuration and enforcement of security compliance policies across a variety of policy types and privilege accounts.

In some embodiments, upon completion of the onboarding processes 205a through 205n, the identity management mechanism 112 may detach from the secured port at the process at block 206. As a result, the privileged accounts, credentials, permissions and schema in the database 122 are finalized for implementation. In some embodiments, the compliance provisioning sub-system 110 or other suitable deployment system may deploy the database 122 to the cloud service 120, thus effectuating a CICD pipeline for the database 122 with automated and consistent provisioning and onboarding according to established security policies. Therefore, credentials, permissions and access is ensured to meet or exceed each data compliance policy applicable to the database 122.

As a result, the database 122 may be automatically and efficiently configured and deployed in response to a provisioning request without the need to manually configure each privileged access account or individually and manually onboard the database 122 to each applicable security service 131. As a result, risks of errors and insecure practices due to human vectors may be mitigated and avoided, thus improving the security and data compliance during and after deployment of the database 122.

Figure 3:
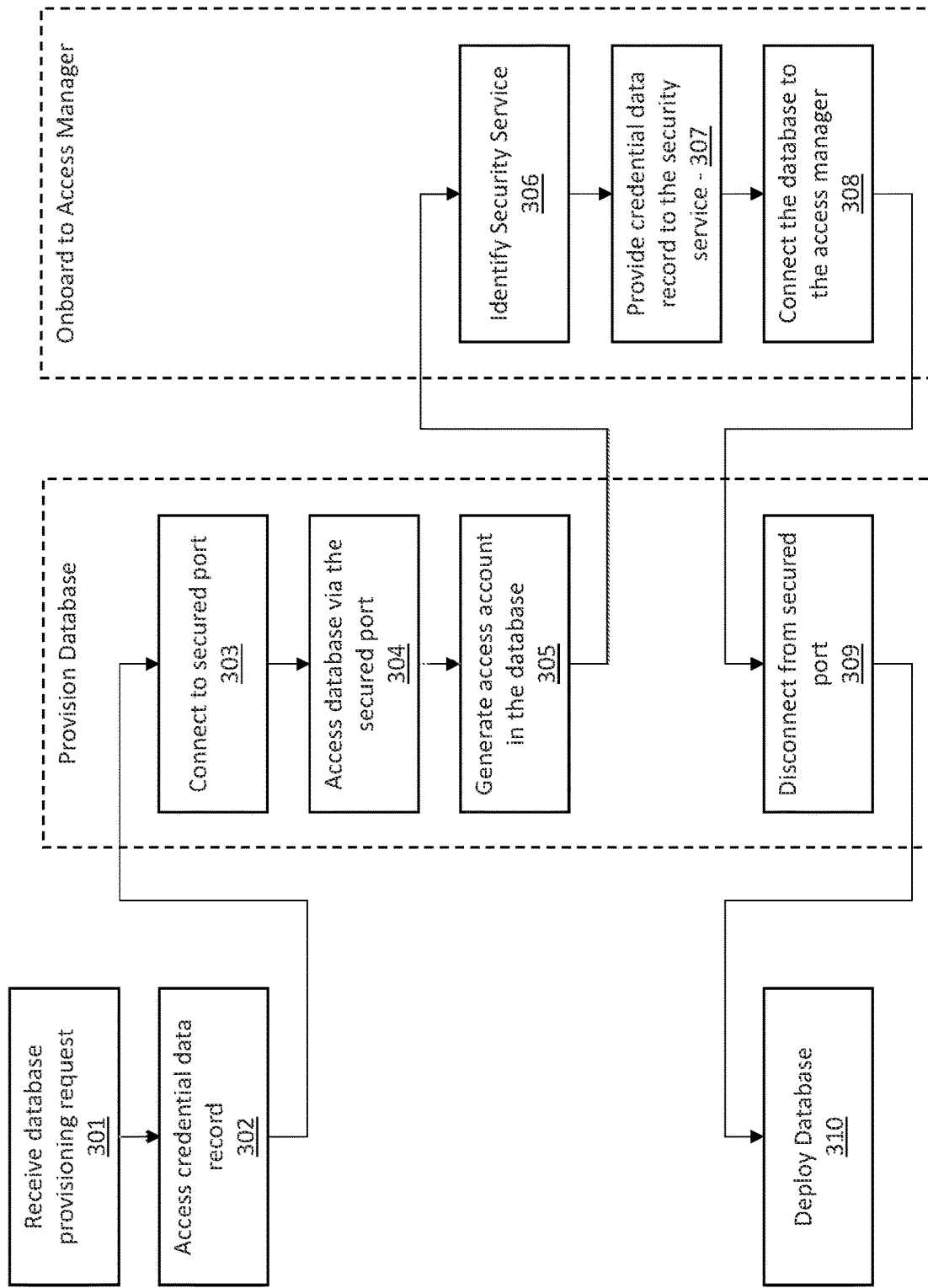

FIG. 3 illustrates a flowchart of an embodiment of a methodology for automatic database provisioning in accordance with one or more embodiments of the present disclosure.

In some embodiments, automatic database provisioning may include a processing system, such as one or more processors, receiving a database provisioning request associated with at least one entity at block 301. In some embodiments, the database provisioning request may specify a database, an application or service for the database, an enterprise team, project or both, among other information related to the use of the database and the data to be stored therein.

In some embodiments, based on the database provisioning request, the processing system may access at least one identity data record via an identity management mechanism associated with the at least one entity at block 302, such as the identity management mechanism 112 described above. In some embodiments, each identity data record may specify a credential identity associated with the entity, and a credential management policy associated with the credential identity. In some embodiments, identity data record may instead or in addition specify identity related data for which the processing system may determine an applicable credential management policy. The identity related data may include, e.g., access type (user or programmatic), permission level, user role within the entity, an associated project, among others and combinations thereof. For example, the credential identity may include programmatic access credential identities, such as, e.g., a master database identity, a shared database identity, an application access identity, a reconciliation account identity, among others and combinations thereof. In another example, the credential identity may include user access credential identities including, e.g., an automation server identity, a user account identity, among others and combinations thereof. In some embodiments, the credential identity can include a programmatic access credential identity, a user access credential identity or both.

In some embodiments, the processing system may provision a database with privileged accounts for the credential identities by connecting to a secured port at block 303. Using the secured port, the processing system may automatically access the database at block 304, e.g., as described above.

In some embodiments, the processing system may automatically generate, or otherwise cause to be generated in the database privilege accounts that provide privilege access to the database for each credential identity at block 305. In some embodiments, the processing system provisions a privilege account for each credential identity by writing into the database the privilege account and associated permissions according to the database schema.

In some embodiments, provisioning the database with the privilege accounts further includes the processing system automatically defining within the database, according to the database schema and security policies, access credential rules. For example, password requirements, encryption requirements and techniques, hash functions, among other credential data may be defined for each privilege account, for sets of privilege accounts, of for the whole database. In some embodiments, the security policies may include credential management policies that govern enterprise, regulatory, industry or other entity compliance policy standards governing access permissions to data in the database.

In some embodiments, the processing system may configure the database to utilize the access credential rules of the credential management policies to automatically manage access credentials for accessing the database via the privilege accounts. For example, the access credential rule may include, e.g., password reset periods, such that based on the password reset periods, new passwords may be automatically generated for accessing the database via the privilege accounts.

In some embodiments, upon provisioning the database with the privilege accounts and the access credentials, the processing system may onboard the database into one or more security services using an automated database onboarding tool. In some embodiments, the automated database onboarding tool, such as, e.g., the identity governance orchestrator 111 described above, may be utilize onboarding API sets to produce API requests to one or more of the security services.

In some embodiments, to produce the API requests, the automated database onboarding tool may identify the security services at block 306. For example, the automated database onboarding tool may identify the types of privilege accounts of the database, a type of data or application associated with the database, or a combination thereof, and identify the associated data compliance and security policies. Based on the identified policies, the automated database onboarding tool may identify security services that enforce, monitory and/or audit the identified policies. The automated database onboarding tool may then select the APIs for each of the identified security services.

In some embodiments, the onboarding may further include the automated database onboarding tool providing the identity data record for each privilege account and the compliance policies to the identified security services at block 307. In some embodiments, the automated database onboarding tool may use the APIs of the identified security services to issues calls that specify the identity data records and the compliance policies for the database in order to configure, at block 308, the identified security services to manage data compliance and identity lifecycles for the database in relation to each privilege account. Thus, the security services may be configured to manage account access to the database based on each identity data record according to each compliance policy, including each access credential rule.

In some embodiments, upon configuring the security services for the database, and thus onboarding the database into the security services, the processing system may automatically disconnect from the secured port of the database at block 309. The processing system may then deploy or cause a CICD pipeline to deploy the database for use at block 310.

Figure 4:
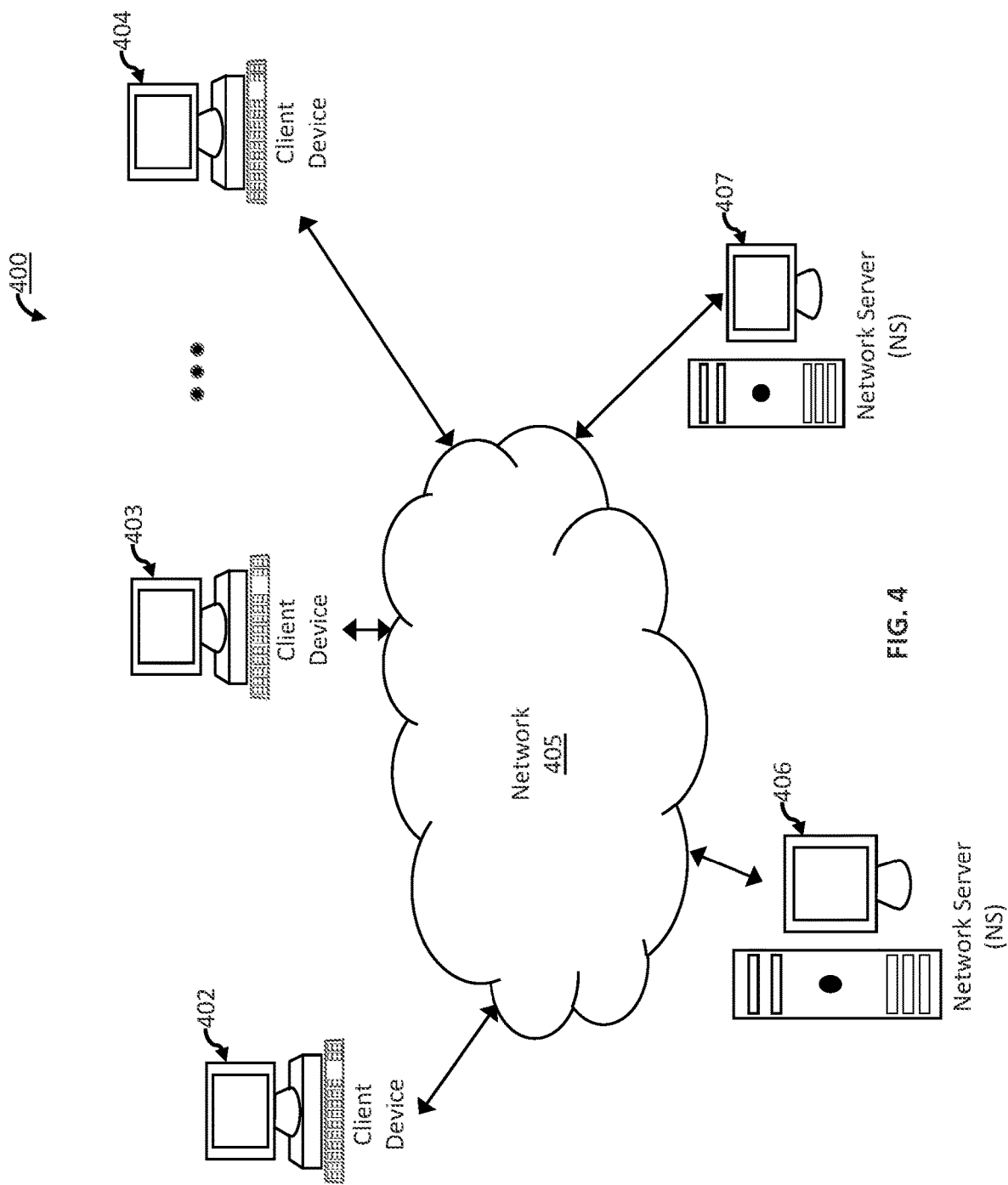

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, members 402-404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member device 402, member device 403 and member device 404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
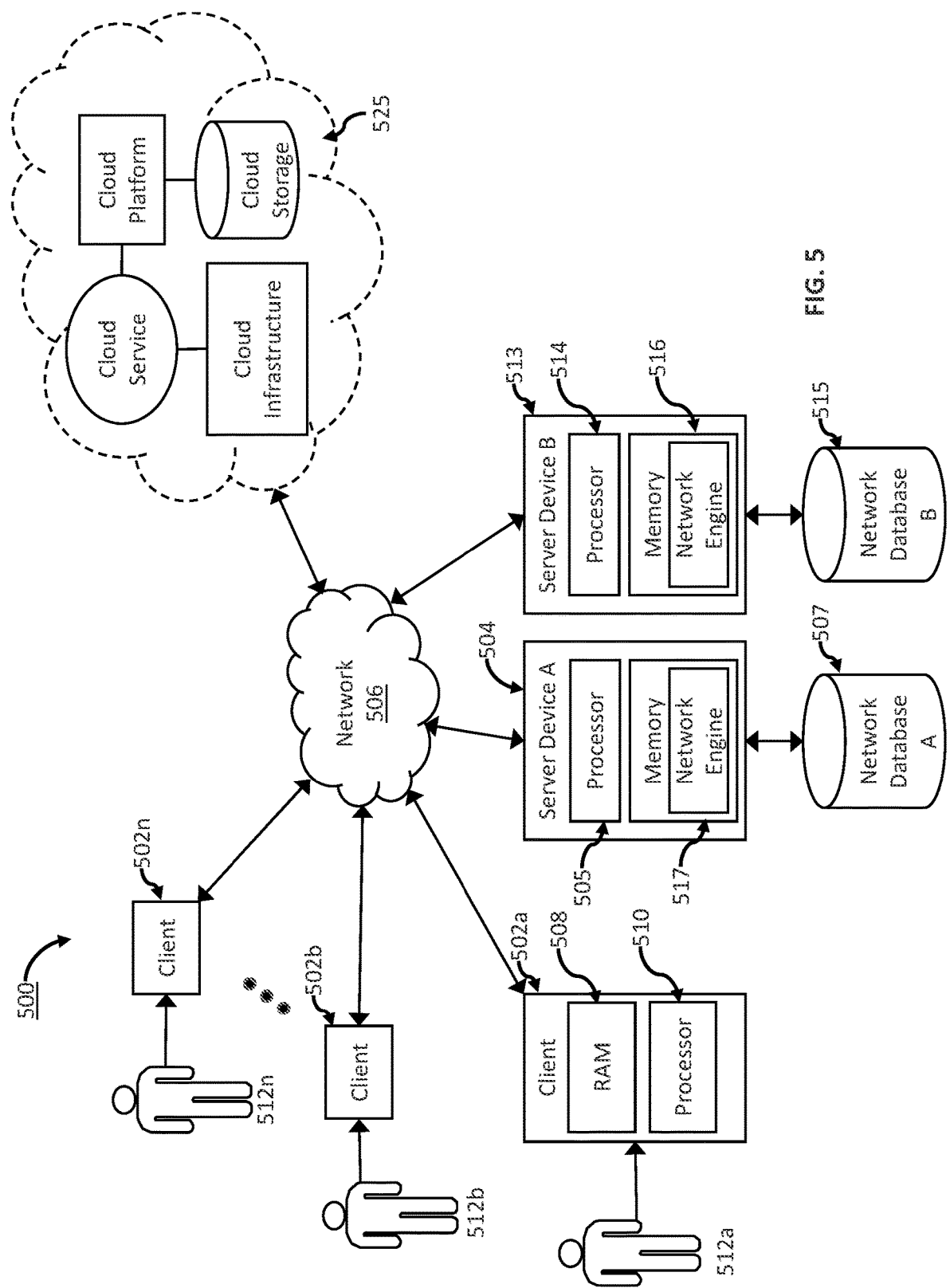

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of member computing device 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, user 512a through user 512n, may communicate over the exemplary network 506 with each other and/or with other systems and/or devices coupled to the network 506. As shown in FIG. 5, exemplary server device 504, including processor 505 and memory with network engine 517, and server device 513, including processor 514 and memory with network engine 516, may be also coupled to the network 506. In some embodiments, one or more member computing devices 502a through 502n may be mobile clients.

In some embodiments, at least one database of exemplary database 507 and database 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
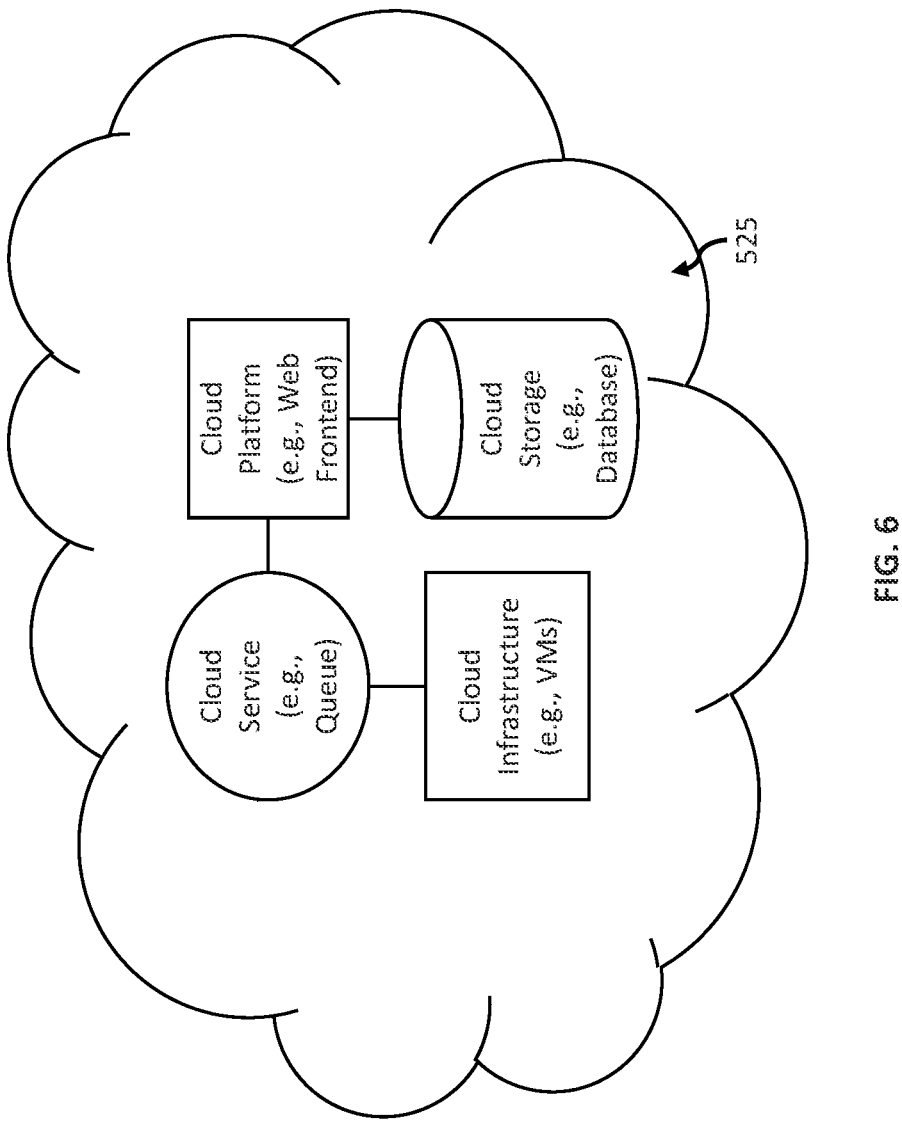
Figure 7:
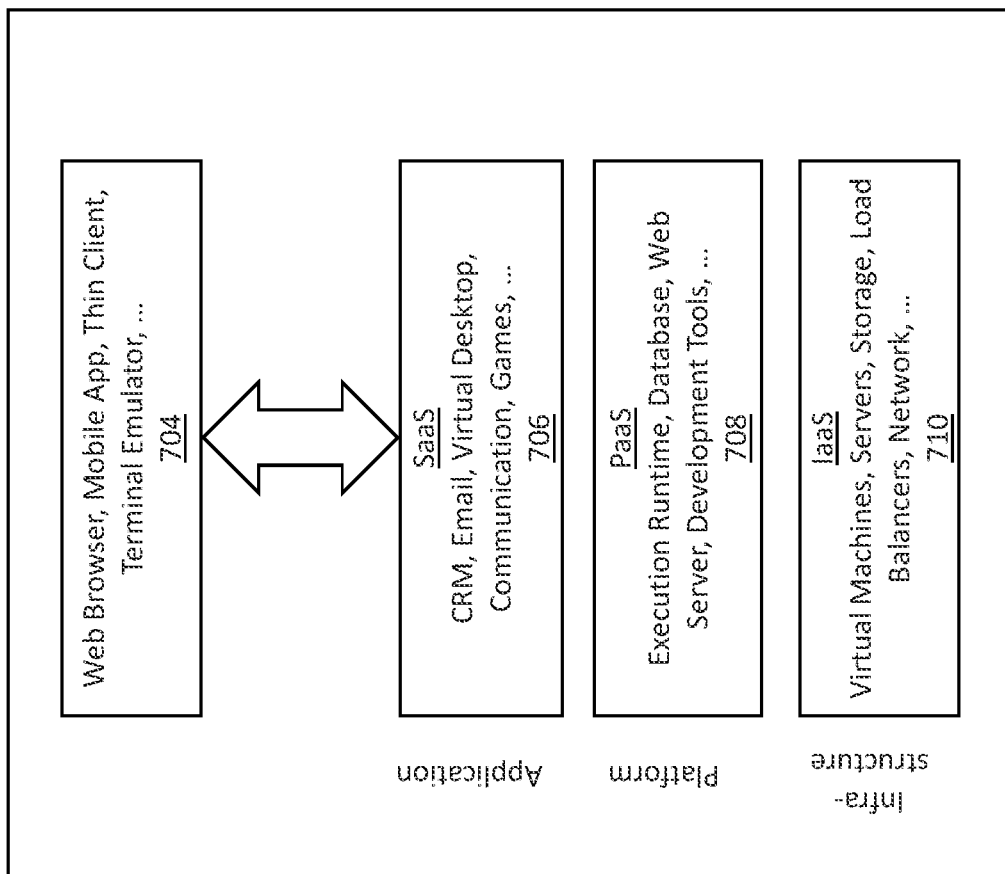

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

At least some aspects of the present disclosure will now be described with reference to the following numbered clauses.

1. A method comprising:
   receiving, by at least one processor, a database provisioning request associated with at least one entity;
      wherein the database provisioning request specifies a database;
   accessing, by the at least one processor, at least one identity data record via an identity management mechanism associated with the at least one entity;
      wherein the at least one identity data record specifies:
         i) at least one credential identity associated with the at least one entity, and
         ii) at least one credential management policy associated with the at least one credential identity;
   automatically accessing, by the at least one processor, the database via a secured port;
   automatically causing, by the at least one processor, to generate in the database, at least one privilege account based on the at least one credential identity;
   automatically causing, by the at least one processor, to define within the database, at least one access credential rule based on the at least one credential management policy;
      wherein the database is configured to utilize the at least one access credential rule to automatically manage access credentials for accessing the database via the at least one privilege account; and
   automatically disconnecting, by the at least one processor, from the secured port of the database.

2. A system comprising:
   at least one processor in communication with a non-transitory computer readable medium having software instructions stored thereon, wherein the at least one processor is configured, upon execution of the software instructions, to perform steps to:
   receive a database provisioning request associated with at least one entity;
      wherein the database provisioning request specifies a database;
   access at least one identity data record via an identity management mechanism associated with the at least one entity;
      wherein the at least one identity data record specifies:
         i) at least one credential identity associated with the at least one entity, and
         ii) at least one credential management policy associated with the at least one credential identity;
   automatically access the database via a secured port;
   automatically cause to generate in the database, at least one privilege account based on the at least one credential identity;
   automatically cause to define within the database, at least one access credential rule based on the at least one credential management policy;
      wherein the database is configured to utilize the at least one access credential rule to automatically manage access credentials for accessing the database via the at least one privilege account; and
   automatically disconnecting, by the at least one processor, from the secured port of the database.

3. The systems and methods of any of clause 1 or 2, wherein the at least one credential identity comprises programmatic access credential identities comprising:
   i) master database identity,
   ii) shared database identity,
   iii) application access identity, and
   iv) reconciliation account identity.

4. The method of clause 1, wherein the at least one credential identity comprises user access credential identities comprising:
   i) an automation server identity, and
   ii) at least one user account identity.
5. The systems and methods of any of clause 1 or 2, wherein the access credentials comprise at least one privilege account password.
6. The systems and methods of clause 5, wherein the at least one access credential rule comprises password reset periods for the at least one privilege account password.
7. The systems and methods of clause 6, further comprising automatically generating, by the at least one processor, new passwords for accessing the at least one privilege account based on the password reset periods.
8. The systems and methods of any of clause 1 or 2, further comprising determining, by the at least one processor based on the at least one credential management policy, the at least one access credential rule from a set of access credential rules.
9. The systems and methods of any of clause 1 or 2, further comprising deploying, by the at least one processor upon disconnecting from the secured port, the database using a continuous integration continuous deployment pipeline.
10. The systems and methods of any of clause 1 or 2, further comprising automatically instantiating, by the at least one processor, an automated database onboarding tool to produce API requests associated with an automated onboarding API set to:
   automatically identify one or more security services,
   automatically provide the identity data record and at least one compliance policy to the one or more security services, and
   automatically cause the one or more security services to configure account access to the database for the identity data record according to at least one compliance policy.
11. The systems and methods of any of clause 1 or 2, further comprising onboarding, by the at least one processor, an identity governance platform to implement the at least one access credential rule.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added, and/or any desired steps may be eliminated).

What is claimed is:

1. A method comprising:
   receiving, by at least one processor of a compliance provisioning sub-system, a database provisioning request associated with at least one entity;
      wherein the database provisioning request specifies a database to be accessed by at least one user and at least one action command to be performed with the database;
      wherein the database is external to the compliance provisioning sub-system;
      wherein the compliance provisioning sub-system comprises:
         an identity management mechanism,
         an orchestrator, and
         an identity index;
   accessing, by the at least one processor, an identity governance platform via the orchestrator, to obtain a security configuration associated with the at least one user from a secret vault stored in the identity governance platform;
   generating, by the at least one processor, at least one identity data record of the at least one user in the identity index via the identity management mechanism associated with the at least one entity based on the security configuration associated with the at least one user;
      wherein the at least one identity data record specifies:
         at least one credential identity associated with the at least one entity and the at least one user, and
         at least one credential management policy associated with the at least one credential identity;
   automatically controlling, by the at least one processor, the identity management mechanism to generate, in at least one security service, at least one privileged account for the at least one user based on the at least one credential identity;
      wherein the at least one security service is configured to govern:
         identity lifecycle management and access management, and
         programmatic identity lifecycle management and programmatic access management;
   automatically controlling, by the at least one processor, the identity management mechanism to define, for the at least one privileged account for the at least one user in the at least one security service, at least one access credential rule for the at least one user based on the at least one credential management policy;
      wherein the identity management mechanism is configured to utilize the at least one access credential rule to automatically manage access credentials for accessing the database via the at least one privileged account;
   automatically establishing, by the at least one processor, a secured port for the at least one user to access the database based on the at least one access credential rule for the at least one user;
      wherein the secured port comprises a communication endpoint of the database;
      wherein the communication endpoint is configured to implement an access policy to the database for the at least one user by applying the at least one access credential rule for the at least one user;
   automatically connecting, by the at least one processor, based on the access policy for the at least one user, the identity management mechanism to the database via the secured port to establish at least one secure connection between the database and the at least one security service; and
   automatically facilitating, by the at least one processor, a performance of the at least one action command with the database via the secured port that is configured to enforce the access policy to complete the database provisioning request.

2. The method of claim 1, wherein the at least one credential identity comprises programmatic access credential identities comprising:
   i) master database identity,
   ii) shared database identity,
   iii) application access identity, and
   iv) reconciliation account identity.

3. The method of claim 1, wherein the at least one credential identity comprises user access credential identities comprising:
  i) an automation server identity, and
  ii) at least one user account identity.

4. The method of claim 1, wherein the access credentials comprise at least one privileged account password.

5. The method of claim 4, wherein the at least one access credential rule comprises password reset periods for the at least one privileged account password.

6. The method of claim 5, further comprising automatically generating, by the at least one processor, new passwords for accessing the at least one privileged account based on the password reset periods.

7. The method of claim 1, further comprising determining, by the at least one processor based on the at least one credential management policy, the at least one access credential rule from a set of access credential rules.

8. The method of claim 1, further comprising deploying, by the at least one processor upon disconnecting from the secured port, the database using a continuous integration continuous deployment pipeline.

9. The method of claim 1, further comprising automatically instantiating, by the at least one processor, an automated database onboarding tool to produce API requests associated with an automated onboarding API set to:
  automatically identify one or more security services,
  automatically provide the at least one identity data record and at least one compliance policy to the one or more security services, and
  automatically cause the one or more security services to configure account access to the database for the at least one identity data record according to the at least one compliance policy.

10. The method of claim 1, further comprising onboarding, by the at least one processor, the identity governance platform to implement the at least one access credential rule.

11. A system comprising:
  at least one processor of a compliance provisioning sub-system in communication with a non-transitory computer readable medium having software instructions stored thereon, wherein the at least one processor is configured, upon execution of the software instructions, to perform steps to:
    receive a database provisioning request associated with at least one entity;
      wherein the database provisioning request specifies a database to be accessed by at least one user and at least one action command to be performed with the database;
      wherein the database is external to the compliance provisioning sub-system;
      wherein the compliance provisioning sub-system comprises:
        an identity management mechanism,
        an orchestrator, and
        an identity index;
    access an identity governance platform via the orchestrator, to obtain a security configuration associated with the at least one user from a secret vault stored in the identity governance platform;
    generate at least one identity data record of the at least one user in the identity index via the identity management mechanism associated with the at least one entity based on the security configuration associated with the at least one user;
      wherein the at least one identity data record specifies:
        at least one credential identity associated with the at least one entity and the at least one user, and
        at least one credential management policy associated with the at least one credential identity;
    automatically control the identity management mechanism to generate, in at least one security service, at least one privileged account for the at least one user based on the at least one credential identity;
      wherein the at least one security service is configured to govern:
        identity lifecycle management and access management, and
        programmatic identity lifecycle management and programmatic access management;
    automatically control the identity management mechanism to define, for the at least one privileged account for the at least one user in the at least one security service, at least one access credential rule for the at least one user based on the at least one credential management policy;
      wherein the identity management mechanism is configured to utilize the at least one access credential rule to automatically manage access credentials for accessing the database via the at least one privileged account;
    automatically establish a secured port for the at least one user to access the database based on the at least one access credential rule for the at least one user;
      wherein the secured port comprises a communication endpoint of the database;
      wherein the communication endpoint is configured to implement an access policy to the database for the at least one user by applying the at least one access credential rule for the at least one user;
    automatically connect, based on the access policy for the at least one user, the identity management mechanism to the database via the secured port to establish at least one secure connection between the database and the at least one security service; and
    automatically facilitate, a performance of the at least one action command with the database via the secured port that is configured to enforce the access policy, to complete the database provisioning request.

12. The system of claim 11, wherein the at least one credential identity comprises programmatic access credential identities comprising:
  i) master database identity,
  ii) shared database identity,
  iii) application access identity, and
  iv) reconciliation account identity.

13. The system of claim 11, wherein the at least one credential identity comprises user access credential identities comprising:
  i) an automation server identity, and
  ii) at least one user account identity.

14. The system of claim 11, wherein the access credentials comprise at least one privilege account password.

15. The system of claim 14, wherein the at least one access credential rule comprises password reset periods for the at least one privilege account password.

16. The system of claim 15, wherein the at least one processor is further configured, upon execution of the software instructions, to perform steps to automatically generate new passwords for accessing the at least one privileged account based on the password reset periods.

17. The system of claim 11, wherein the at least one processor is further configured, upon execution of the software instructions, to perform steps to determine, based on the at least one credential management policy, the at least one access credential rule from a set of access credential rules.

18. The system of claim 11, wherein the at least one processor is further configured, upon execution of the software instructions, to perform steps to deploy, upon disconnecting from the secured port, the database using a continuous integration continuous deployment pipeline.

19. The system of claim 11, wherein the at least one processor is further configured, upon execution of the software instructions, to perform steps to automatically instantiate an automated database onboarding tool to produce API requests associated with an automated onboarding API set to:
- automatically identify one or more security services,
- automatically provide the at least one identity data record and at least one compliance policy to the one or more security services, and
- automatically cause the one or more security services to configure account access to the database for the at least one identity data record according to the at least one compliance policy.

20. The system of claim 11, wherein the at least one processor is further configured, upon execution of the software instructions, to perform steps to onboard the identity governance platform to implement the at least one access credential rule.

* * * * *